March 27, 1951  V. J. POPOLI  2,546,146
REEL FOR MOTION-PICTURE FILM
Filed May 9, 1947  3 Sheets-Sheet 1
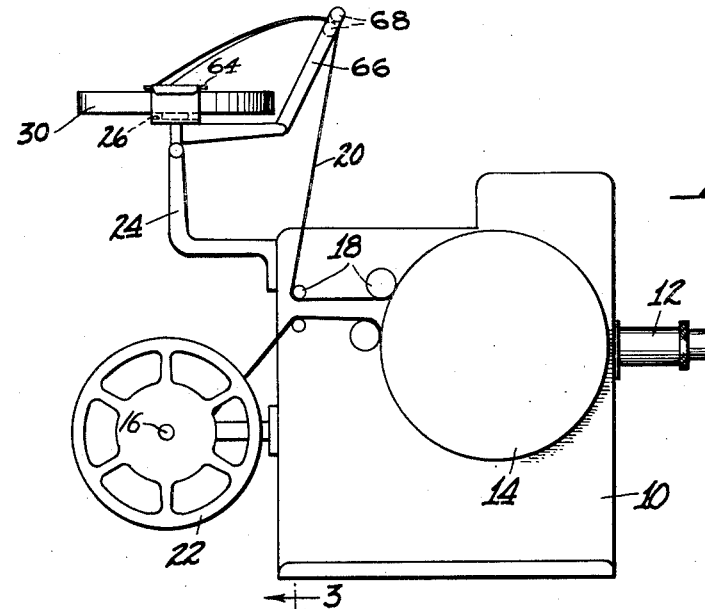
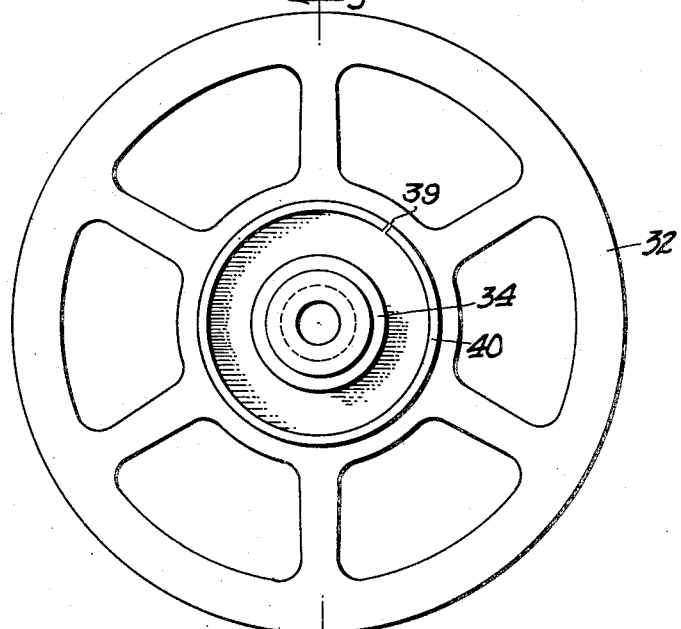
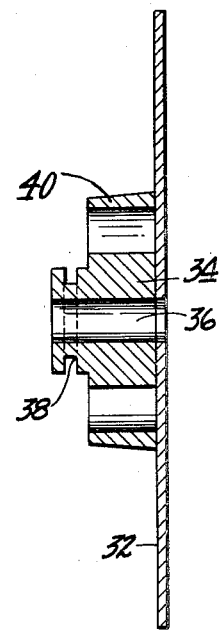
INVENTOR.
Vincent J. Popoli
BY Charles R. Fay,
ATTORNEYS.

March 27, 1951 V. J. POPOLI 2,546,146
REEL FOR MOTION-PICTURE FILM
Filed May 9, 1947 3 Sheets-Sheet 2
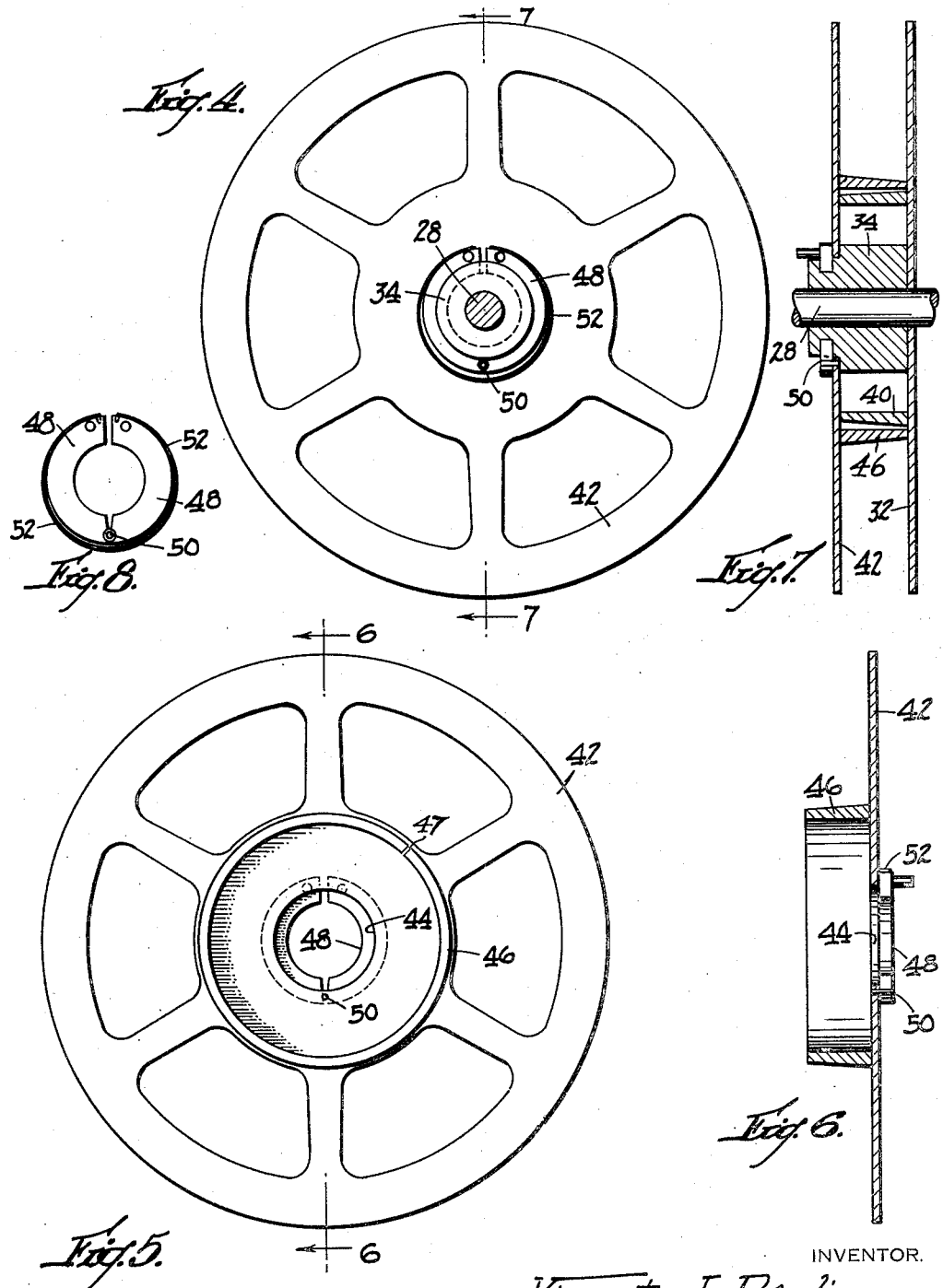
INVENTOR.
Vincent J. Popoli
Charles R. Fay
BY
ATTORNEYS.

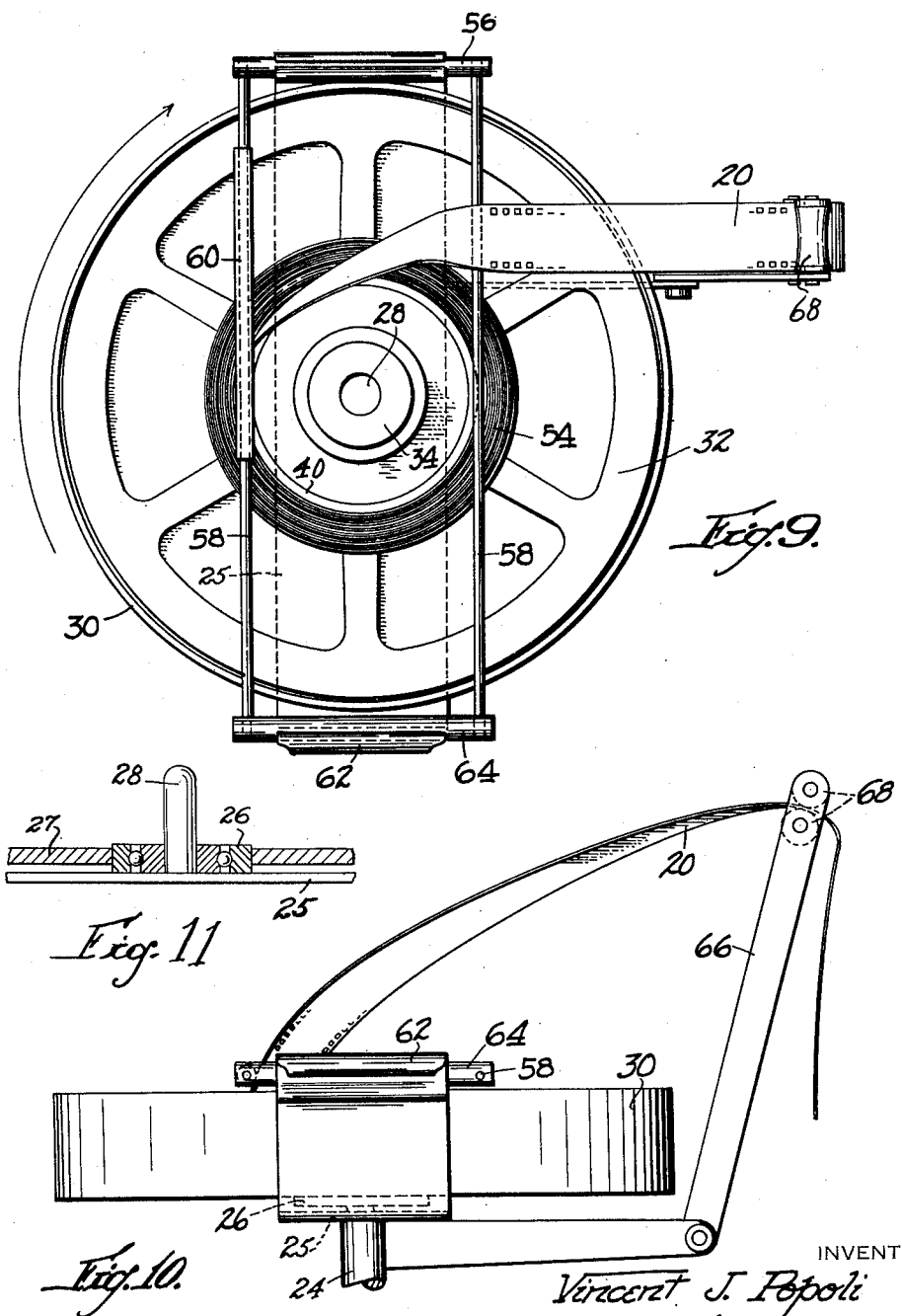

Patented Mar. 27, 1951

2,546,146

UNITED STATES PATENT OFFICE 2,546,146

REEL FOR MOTION-PICTURE FILM

Vincent J. Popoli, Ayer, Mass.

Application May 9, 1947, Serial No. 747,047

5 Claims. (Cl. 242—70)

This invention relates to reels for motion picture film, ribbon or wire, or any reproducing or other apparatus needing rewinding.

The principal object of the invention resides in the provision of a new and improved reel or film, ribbon or wire winding device for motion picture projectors, or any other apparatus that requires rewinding, the improvement residing in the provision of a reel avoiding the necessity of rewinding of the film, ribbon, or wire after showing or reproducing the same.

Further objects of the invention include the provision of a half-reel for motion picture projectors or other reproducing equipment, which may be used either as the take off unwinding reel of the film, ribbon or wire or at the point of take up, and, therefore, at the end of the showing, the new half-reel is merely removed from its spindle and substituted for the unwinding film reel, the latter being placed in the original position of the take up winding reel; and the provision of a second half-reel for taking up purposes, and another half-reel for storage.

Other objects and advantages of the invention will appear hereinafter.

Reference is to be had to the accompanying drawings in which

Fig. 1 is a view in side elevation of a projector showing the invention applied thereto;

Fig. 2 is a view in elevation of the new half-reel;

Fig. 3 is a section on line 3—3 of Fig. 2 and showing the storage half-reel;

Fig. 4 is a view in elevation of a detachable half-reel for taking up;

Fig. 5 is a view of the other side of the device of Fig. 4;

Fig. 6 is a section on line 6—6 of Fig. 3;

Fig. 7 is a section on line 7—7 of Fig. 4;

Fig. 8 is a detail of the reel side clamp;

Fig. 9 is a top plan view of the reel in the rewinding position;

Fig. 10 is a view in side elevation of the device of Fig. 9; and

Fig. 11 is a section showing the bearing construction.

As shown in the drawings there is provided any projector or other reproducer 10 shown here as having a lens mount 12, a loop forming wheel or the like 14, a spindle 16 for the winding reel, and various appropriate guides 18 for the film, ribbon or wire. The latter is indicated at 20 and travels over the loop forming wheel 14 behind the lens and to the winding take up reel indicated at 22.

A bracket 24 mounts at its upper end a horizontal support 25 for a spindle 28. A receptacle having a flange 30 and a bottom 27 is centrally provided with a ball bearing 26, see Fig. 11.

The reel forming the present invention comprises two parts, one half-reel being shown in Figs. 2 and 3 and the other half of which is shown in Figs. 5 and 6, the two parts being shown as joined together in Figs. 4 and 7 for a purpose which will be apparent hereinafter. The half-reel of Figs. 2 and 3 comprises a conventional disc 32 having mounted thereon a spindle receiving bushing 34 centrally apertured at 36 to a degree slightly larger than the spindle 28. The bushing 34 extends laterally outwardly and is provided with an annular groove 38. An annular film, ribbon or wire guiding rib or hub 40 is provided at the same side of the disc 32 as is the bushing 34, and may have a slot 39 to receive the end of the wire, film, or ribbon.

The other half of the reel comprises a disc 42 similar to that at 32 and has a large central opening 44 receiving bushing 34 and an outwardly extending annular film, ribbon or wire guiding rib or hub 46 which is provided with an exterior slanting peripheral edge as clearly shown and a slot 47.

These two reel halves may be put together as shown in Fig. 7 to form a single complete reel for taking up only and having a pair of spaced discs, i. e., those at 32 and 42. Mounted to pivot on disc 42 there is a pair of semi-circular arms 48 as, for instance, on a pin 50. These arms are arranged concentrically with the hole 44 and are spring-pressed toward each other as, for instance, by a pair of curved leaf or wire springs 52 so that the arms 48 may be snapped into the annular groove 38 on bushing 34 to clip the two reel parts together as shown in Fig. 7.

The combined reel which is above described is placed on spindle 16 and the film, ribbon or wire is wound thereon during reproduction.

As the film is projected it winds upon the annular member 46 which is located radially outwardly and surrounds the element 40 on the reel half 32. When the film, ribbon or wire has been completely projected the combined reel is removed from spindle 16 in the usual manner, reel half 42 is removed by opening the spring-pressed arms 48 and in so doing the film, ribbon or wire is pushed off from the annular part 46 so as to be then located on annular part 40 on the reel-half 32. The disc 32 is then placed in the holder 30 as shown in Fig. 9, over spindle 28. The leading end of the film is naturally inside the roll of film 54 and by reason of the fact that the annular part 40 is smaller in diameter than the annular part 46, the leading end of the film, ribbon or wire is easily grasped for again threading through the projector, although the roll 44 is centered by part 40. In this way the film, ribbon or wire is reprojected without necessity of rewinding. The receptacle and reel-half rotate together on the spindle due to the bearing 26, see the arrow in Fig. 9.

Mounted on the support 25 there is provided a hinge pin 56 to which are secured a pair of rods 58 for pivoting movement to overlie the receptacle 30 as in Figs. 10 and 9, or to be pivoted up to allow removal and insertion of the half-reel 32. One of the rods 58 is provided with a roller 60 against which the film will bear at one edge thereof as it unwinds from the roll to be projected. A snap clip 62 is provided to hold down the free end 64 of the hold down device 58.

This invention also contemplates an adjustable arm 66 mounting a pair of film guide rolls 68 so as to lead the film, ribbon or wire up out of the receptacle 30 down to the conventional guides 18.

In order to project a complete film this invention requires two reel halves, but one only of reel-half 42, because the latter is used as the winding reel in conjunction with reel-half 32 whereas the latter alone is used in the projecting position in the receptacle 30.

Having thus described my invention and the advantages thereof, I do not wish to be limited to the details herein disclosed otherwise than as set forth in the claims, but what I claim is:

1. A film, ribbon or wire reel comprising a pair of separable spaced discs, an annular hub on each disc, said hubs being concentric and one being of larger diameter than the other, a central spindle bushing on one disc projecting to the other disc, and means detachably securing the discs together, said discs being effective to wind the film, ribbon or wire, the smaller hub alone being effective to hold the same for unwinding, and means on the smaller hub to hold the strip.

2. The reel of claim 1 wherein the spindle bushing is located on the disc having the smaller hub.

3. A film, ribbon or wire winding reel comprising a pair of spaced separable discs, an annular film guiding hub on each disc, said hubs being concentric but of different diameters, the smaller hub fitting in the larger, means to detachably secure the discs together for taking up film, ribbon or wire on the larger hub in a roll, the discs being separable and the wound roll transferable to the smaller hub for unwinding from the inside of the roll, and means on the smaller hub to receive and hold an end of the strip.

4. The reel of claim 3 including a hollow spindle bushing on the disc having the smaller hub, the other disc having an opening receiving the bushing, and spring latch means on the other disc for resilient detachable connection to the bushing.

5. A reel half comprising a disc, a hollow bushing thereon extending to one side thereof, a concentric annular hub mounted on the disc and surrounding the bushing, the hub having its exterior surface inclined so that the exterior hub surface converges in a direction away from the disc a second disc having a central opening receiving the bushing, means to clip the second disc to the bushing, an annular take-up hub on the second disc larger than the first named hub, the hub on the second disc having an exterior surface inclined oppositely to the exterior surface of the first named hub, the larger hub surface providing for easy dislodgement therefrom of the material wound thereon when the clip means is removed.

VINCENT J. POPOLI.

REFERENCES CITED

The following references are of record in the file of this patent:

UNITED STATES PATENTS

| Number | Name | Date |
|---|---|---|
| 619,803 | Succie | Feb. 21, 1899 |
| 980,378 | Wiggins | Jan. 3, 1911 |
| 1,503,896 | Harris | Aug. 5, 1924 |
| 2,089,787 | Goldberg | Aug. 10, 1937 |
| 2,201,305 | Springer | May 21, 1940 |

FOREIGN PATENTS

| Number | Country | Date |
|---|---|---|
| 561,588 | Germany | Oct. 15, 1932 |